(12) United States Patent
Bartlett et al.

(10) Patent No.: US 10,618,129 B2
(45) Date of Patent: Apr. 14, 2020

(54) AUTOMATED ADAPTIVE MAINTENANCE METHOD AND SYSTEM FOR WELDING GUN ELECTRODES

(71) Applicant: SINTERLEGHE S.R.L., Turin (IT)

(72) Inventors: Vincent Bartlett, Hertfordshire (GB); Sullivan Smith, Cambridgeshire (GB); Andrew Woloszyn, Cambridgeshire (GB)

(73) Assignee: SINTERLEGHE S.R.L., Turin (IT)

( * ) Notice: Subject to any disclaimer, the term of this patent is extended or adjusted under 35 U.S.C. 154(b) by 752 days.

(21) Appl. No.: 15/021,406

(22) PCT Filed: Sep. 13, 2013

(86) PCT No.: PCT/EP2013/069034
§ 371 (c)(1),
(2) Date: Mar. 11, 2016

(87) PCT Pub. No.: WO2015/036038
PCT Pub. Date: Mar. 19, 2015

(65) Prior Publication Data
US 2016/0221111 A1  Aug. 4, 2016

(51) Int. Cl.
*B23K 11/30* (2006.01)
*B23K 11/25* (2006.01)
*B23K 11/11* (2006.01)

(52) U.S. Cl.
CPC .......... *B23K 11/3063* (2013.01); *B23K 11/11* (2013.01); *B23K 11/25* (2013.01)

(58) Field of Classification Search
CPC .......................... B23K 11/3063; B23K 11/25
See application file for complete search history.

(56) References Cited

U.S. PATENT DOCUMENTS 6,750,418 B1 * 6/2004 Nastasi, Jr. .......... B23K 11/252
219/109
8,901,449 B2 * 12/2014 Takayama ............. B23K 11/115
219/86.1
(Continued)

FOREIGN PATENT DOCUMENTS

DE  10201003552  *  8/2010
DE  10201003552  *  4/2011
(Continued)

OTHER PUBLICATIONS

International Search Report for PCT/EP2013/069034 dated Aug. 6, 2014.
PCT/EP2013/069034 Written Opinion.

*Primary Examiner* — Ibrahime A Abraham
*Assistant Examiner* — Elizabeth M Sims
(74) *Attorney, Agent, or Firm* — Arent Fox LLP; Michael Fainberg (57) ABSTRACT

An automated welding electrode adaptive maintenance method and system are disclosed, including: —acquiring a predetermined electrode maintenance schedule, including electrode maintenance parameters; —acquiring welding electrode parameters representative of a wear condition of at least one electrode at a predetermined maintenance frequency; —selecting a maintenance operation for at least one electrode based on the comparison of the electrode parameters representative of the wear condition of at least one electrode with predetermined reference parameters; —issuing a signal to a selected maintenance station for performing the selected maintenance operation; and —controlling adjusting the electrode maintenance frequency based on the electrode parameters representative of the wear condition of at least one electrode.

16 Claims, 4 Drawing Sheets

(56) References Cited

U.S. PATENT DOCUMENTS

| | | | | |
|---|---|---|---|---|
| 2008/0237303 | A1* | 10/2008 | Lin | B23K 11/3063 228/103 |
| 2009/0173725 | A1* | 7/2009 | Holcomb | B23K 11/252 219/130.01 |
| 2010/0136883 | A1* | 6/2010 | Call | B23B 5/166 451/5 |
| 2011/0146363 | A1* | 6/2011 | Tezawa | B23K 11/115 72/199 |
| 2012/0018408 | A1* | 1/2012 | Wang | B23K 11/115 219/117.1 |
| 2012/0200695 | A1* | 8/2012 | Yamane | B23K 11/3063 348/90 |
| 2013/0029568 | A1* | 1/2013 | Tamm | B24B 19/16 451/294 |

FOREIGN PATENT DOCUMENTS

| | | | | | |
|---|---|---|---|---|---|
| DE | 102010035552 | A | | 4/2011 | |
| EP | 1964639 | A | | 9/2008 | |
| EP | 1964639 | A1 | * | 9/2008 | B23K 11/11 |
| EP | 1964639 | A1 | * | 9/2008 | B23K 11/11 |
| JP | 03297584 | A | * | 12/1991 | |
| JP | 03297584 | A | * | 12/1991 | |
| JP | H03297584 | A | | 12/1991 | |
| JP | H07148581 | A | | 6/1995 | |

* cited by examiner

AUTOMATED ADAPTIVE MAINTENANCE METHOD AND SYSTEM FOR WELDING GUN ELECTRODES

CROSS-REFERENCE TO RELATED APPLICATIONS

This application is a National Stage entry of International Application No. PCT/EP2013/069034, filed Sep. 13, 2013, the entire contents of which are incorporated herein in their entirety by reference.

The present invention generally relates to resistance spot welding, and particularly to a method and a system for controlling electrode quality of welding gun electrodes in a welding plant.

Resistance spot welding (RSW) is a well established process for joining sheet metal in many technological fields. The RSW technique is the mainstay of high volume sheet metal joining applications in steel body assemblies due to its speed, flexibility, reliability and low cost.

The automotive sector currently relies heavily on RSW for manufacturing the body-in-white (BIW)—the primary stage of vehicle body construction. For this, production lines utilize RSW guns to apply the welds, each using consumable electrodes (or "tips") to contact the work-pieces and transmit the welding current and force to make the weld. These electrodes are the most important component in a spot welding system, and their degradation, which occurs during welding (coated) steel vehicles, can rapidly lead to sub-standard weld quality (which in turn can cause expensive line stoppages).

Modern automatic RSW manufacturing cells comprise several equipment and control systems, which enable a range of material type/thickness joints to be automatically spot welded with a high degree of positional accuracy and speed. Spot weld quality is controlled by two key factors:
- The selection and control of correct weld parameters (weld current, time and force);
- The correct choice and maintenance of the electrodes (material, form and condition) which transmit these parameters to the work-piece.

A large number of solutions to the problem of optimizing quality in RSW are based on the selection and control of correct weld parameters. Weld controller technology includes MF-DC inverter power sources and adaptive weld control that offer a high level of quality assurance necessary for reliable high volume RSW welding. However, these systems control parameter settings but not the electrode condition.

During normal spot welding operations, the electrodes get worn, deformed and contaminated with grease, dirt and coatings (such as zinc) present on the surface of the materials being welded. Therefore, the electrodes have to be frequently maintained using electrode 'tip dresser' systems, to regain a clean surface and proper shape. It is necessary to remove a minimum thickness of contamination deposits that form on the electrode surfaces. The thickness of the deposit affects the overall electrical and thermal conductivity of the electrode. Along with the welding parameters, the shape and size of the electrode determine the size of the weld. Without any intervention, the electrode surface area increases, which will in turn cause the weld diameter to reduce; ultimately below the minimum level needed to ensure weld integrity and meet quality requirements.

To counter the effect of electrode wear, the welding current can be increased. However, this accelerates electrode degradation, and can only be used for a limited number of welds before the electrodes must be dressed or replaced.

Electrode dresser systems are commonly utilized on production lines in an attempt to maintain the quality of the electrodes. However, existing systems require manual set-up, optimization and continued monitoring during production. This cannot be reliably or consistently performed for large production lines, and feedback from weld engineers responsible for RSW systems consistently state that poor electrode dressing is the primary cause of spot weld quality problems and associated production stoppages. With a vehicle typically rolling off a production line every 1-2 minutes, an electrode dressing issue causing even a 5 minutes line stoppage once per day can result in a loss of 10 vehicles per week, i.e. several hundred vehicles per year.

In addition, the resistance spot welding process is not generally applied for welding aluminium sheets. This is because aluminium sticks very aggressively to the copper electrodes resulting in rapid electrode tip contamination and erosion. Conventional electrode tip dressing systems remove a significant quantity of copper form the electrode tip. Because of the high frequency of dressing required (due to the rapid degrading effect of aluminium on copper alloy electrodes), the electrodes are quickly consumed and need to be replaced after few components have been manufactured. Ultimately, this prevents the application of RSW to aluminium bodies in the automotive manufacturing, thus forcing the use of higher cost technologies, primarily self-pierced riveting.

There is a need in this technical field to optimize the removal of material deposited on the electrodes, for both steel and aluminium welding applications.

Heretofore, dressing processes are carried out at regular intervals, according to standardized parameters, concerning the duration of the dressing phase and the clamping force with which the welding gun closes its electrodes on the dressing unit. Standard parameters, in terms of time and force, represent a compromise that is suitable in most cases. However, the removal of material occurs without knowledge of the exact thickness of the surface layers of electrodes that should be removed.

Typically, maximizing electrode quality rely on manual set-up and control by weld technicians and maintenance personnel, who often have neither the time nor the skill required to optimize a dressing system for a manufacturing cell or an entire production line. Usually, an experienced operator in the production line decides that an electrode or a pair of electrodes of the welding gun need dressing after a certain number of welding operations (welding spots) depending on the welding conditions, e.g. on the intensity of the electrical current passing through the electrodes.

Further, dressing has heretofore been carried out in an undifferentiated manner to both the anode and the cathode. Since a greater deposit of material and oxides occurs on the cathode, in order to optimize electrode duration and operation, deposits should be removed to a greater extent from the cathode than from the anode.

In addition to the above, control of electrode dressing parameters is critical for consistent electrode maintenance. This relies on the generation of a "electrode maintenance schedule" of recommended electrode maintenance parameters (initially based on the dresser manufacturer's recommendations). Electrode-dresser manufacturers recommended settings are not optimum for every RSW gun application.

Currently, every electrode maintenance schedule must be manually adjusted as and when required to optimize electrode performance and life, or when an electrode dress related weld failure dictates that a change is necessary. Where possible, the performance of the electrode dressing equipment during a vehicle launch/current production is observed and optimized. However, this relies on weld technicians operating to continually monitor the resulting weld quality. In order to accomplish a high degree of control the technician needs to have a thorough understanding of all the variables that can influence electrode quality (and the resulting weld quality, which will alter) following electrode dressing. In practice, this is also limited by technician availability.

Therefore, the main objective of the present invention is to improve weld quality and reliability, and specifically to perform the maintenance operation of the electrodes of a welding gun in an optimized manner without manual intervention.

It is a further objective of the invention to select the most suitable maintenance operation based on the conditions of the welding electrodes.

Advantageously, maintenance optimization prolongs the useful life of the welding electrodes. Consequently this involves a reduction of the idle time required for stopping a production line in order to replace the worn electrodes. A standstill of a line involves an economic loss, which sometimes may even be unnecessary in case the electrodes do not really need to be redressed or replaced.

An additional objective of the invention is to increase safety for the personnel working on a welding line.

A reduction in the number of manual operations is also beneficial as it reduces the risk of accidents.

Another objective of the invention is to guarantee the quality of the spot welds, i.e. that the welds have been applied according to certain welding parameters (intensity of current applied, application time of the current, clamping force or pressure applied by the welding gun) and with electrodes having an optimal geometric shape. Ultimately, this would allow a reduction in the total number of welding spots required in a given welded assembly, where current practice requires an additional percentage of welding points to be made for quality assurance and safety reasons.

Therefore, an additional objective of the invention is to reduce the number of spot welds, as well as time and costs that this entails.

The above and other objectives and advantages, which will be better understood hereinafter, are achieved according to the present invention by an automated adaptive welding electrode maintenance method and system having the features defined in the appended claims.

Specific embodiments are the subject of the dependent claims, whose content is to be considered as an integral part of the present description.

In summary, the automated adaptive maintenance method and system for maintenance of the electrodes of a welding gun, i.e. for resetting welding electrodes to their original conditions or to conditions for optimal welding, is based on the detection of the electrode wear conditions of said electrodes and the performance of a selected maintenance (resetting) operation depending upon the detected condition.

Maintenance operations include preferably abrasive dressing operations, cutting operations, replacement operations, in an increasing strength-of-resetting scale.

The adaptive welding electrode maintenance method and system are based on the acquisition of geometric (i.e. dimensional and morphological) measurements of the welding electrode in use as well as cleanliness measurement, and their use by a processing unit for judging the level of degradation of the electrodes and for controlling an electrode maintenance schedule. An appropriate maintenance station may be selected as a function of the electrode maintenance schedule and the detected measurement, including a cutting device, a more or less aggressive abrasive dressing operation, or the processing unit may decide that the electrode(s) need(s) replacing.

The acquisition of the geometric and cleanliness measurements of the welding electrodes in use is performed by means of sensor equipment.

The sensor equipment will preferably assess quality of the electrode before or immediately after maintenance. The automated welding electrode adaptive maintenance system and method according to the invention is adapted to learn optimum maintenance parameters, adjusting dressing force/time until the electrode quality is consistently maintained after each maintenance operation. The basic principle is that of feedback of electrode quality data from the sensor equipment following each maintenance operation to allow electrode quality to be regularly checked and more importantly, consistently maintained. This would be accomplished by adjusting the maintenance parameters (force/time of the maintenance operations) implemented by the maintenance stations.

The system of the invention may be conveniently located at a working station and coupled to the sensor equipment and to the maintenance stations. In a currently preferred embodiment, the system may include a control and processing station (acting as decision making unit) be embedded within the sensor equipment and an associated working station may be suitably programmed so as to query the control and processing station and to perform any operation instruction received therefrom, including controlling the maintenance stations.

Advantageously, the effectiveness of the method and system according to the present invention is its ability to apply optimum electrode maintenance parameters from the outset of production welding by automatically generating an electrode maintenance schedule as the welding is begun, and to detect and respond to any degradation in electrode quality during subsequent production.

Advantageously the automated method and system according to the invention allow for more frequent maintenance with minimal material removal, which allows more consistent weld quality to be achieved. This will significantly reduce rework and associated costs, and ultimately improve production life of the electrodes by at least a factor of 3.

Particularly, frequent maintenance controls and minimises aluminum contamination and therefore it allows for RSW to be introduced to cost-competitive high volume spot welding of aluminum, which is not currently commercially applied, and as a result to production of lower cost lightweight vehicles leading to a significant reduction of $CO_2$ emissions.

The invention also relates to a computer program, in particular a computer program stored in or conveyed by an information carrier, arranged to perform the adaptive maintenance method of the invention. The information carrier can be any entity or device capable of storing and/or conveying the program. For example, the carrier may be a storage physical product, such as a ROM memory, a RAM memory or a magnetic recording medium, or it may be an electrical or optical signal, which can be transmitted through an electrical or optical physical connection, by radio signals or by other means, e.g. downloaded over a wide area network.

The features and advantages of the invention will become apparent from the following detailed description, given by way of non-limiting example, of a preferred embodiment thereof. Reference is made to the accompanying drawings, in which:

FIG. 3 (divided in FIGS. 3a and 3b for layout constraints) is a flow chart of an automated welding electrode assessment with control functions to enable automated adaptive electrode maintenance in an automated adaptive welding electrode maintenance method within a RSW production environment implemented by the system of FIG. 1.

Figure 1:
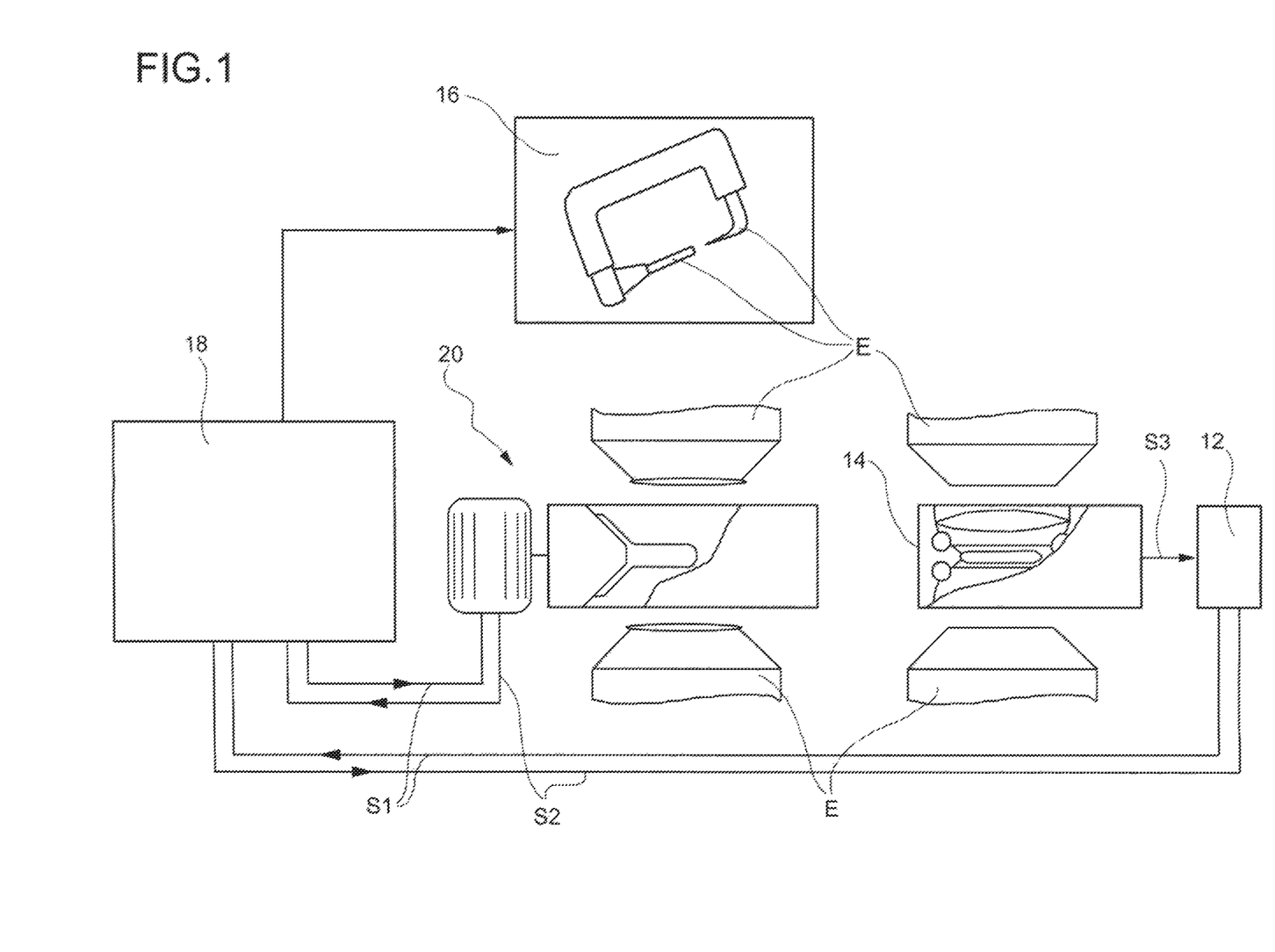
FIG. 1 is a block diagram of an adaptive welding electrode maintenance system according to the invention.

Referring initially to FIG. 1, numeral 10 generally designates a system for controlling the operation of welding electrodes in a welding gun of a manufacturing plant.

System 10 includes a software-based control and processing station 12 that is preferably associated with a sensor equipment 14 designed to detect images of a pair of spot welding electrodes E carried by the welding gun, and is coupled to a welding gun 16, e.g. by means of a control unit of a robot or transportation system 18 arranged for moving the welding gun in welding positions, the robot or transportation system being also arranged for moving the welding gun to a maintenance station assembly 20 for performing maintenance (electrode dressing, cutting and electrode changing) operations on at least one of said pair of spot welding electrodes.

For example, the above elements of this system are integrated into a production environment where a means of transportation of the welding electrodes is present (for example a robot or other computer controlled transportation system). The transportation system is adapted to run computer programs that carry the electrodes to each station where maintenance tasks are performed. In the currently preferred embodiment, the control unit of the transportation system is adapted to carry out pre-programmed functions and to wait for control signals from the software-based control and processing station 12, which carry information regarding what sub program is required to perform work at the next station.

The control and processing station 12 is adapted to output an operation information signal S1 to the control unit of the robot or transportation system 18, and to receive a maintenance signal S2, from the maintenance station assembly 20, via the control unit of said robot and transportation system, for controlling maintenance operations on the welding electrodes. The control and processing station 12 is also adapted to receive at an input an electrode monitoring signal S3 from the sensor equipment 16.

Welding guns are generally known, and therefore will not be described nor illustrated.

Typically, the control and processing station 12 is a self-contained unit comprising a microprocessor based circuit with a local storage and communications means capable of connecting with the transport control system. The control and processing station 12 is also adapted to be configured over the communications means mentioned above.

In any case the embodiments of a control and processing station referred to herein are considered well-known in the art and will not be further described herein because they are not relevant for the purposes of implementation and understanding of the present invention.

Sensor equipment 14 is arranged to acquire the geometric and cleanliness measurements of the welding electrodes in use. In a preferred embodiment the sensor equipment 14 includes an optical reflection system, which illuminates the faces of the electrodes and takes measurements of both reflectivity and the area/shape of the electrode surface. In this way, electrode face diameter and material condition, which are the two key factors determining the quality of the weld, will be assessed. The sensor equipment will generate quantitative measures of the quality of the electrode, and preferably of the electrode length, i.e. the distance between the electrode shoulder and electrode base and the electrode tip diameter, i.e. of the central area of the welding electrode that contacts the work piece to create the spot weld, as well as of the electrode cleanliness. Electrode cleanliness represents a degree of contamination of the electrode. Where the electrode tip surface is viewed under illumination, the "cleanliness" is derived from a measurement of the reflected light from the electrode tip surface. Deposition of contaminates such as oxides or material build up, reduce the reflectivity of the surface. The measurement of the cleanliness of the electrodes is more preferably determined as a numeric value and is categorized into one of a predetermined plurality of predefined ranges. Higher levels of cleanliness indicate a good electrode condition where less frequent and less severe maintenance schedules are required. Low levels of cleanliness indicate that more frequent and more severe electrode maintenance is required.

The maintenance station assembly 20 preferably includes a first cutting station, a second abrasive dressing station and a third replacement station.

The cutting station is arranged for performing a cutting operation, i.e. for restoring electrode geometry by means of a shaping operation that uses an edged cutting tool. The cutting process also restores the electrode geometry and cleanliness. Cutting operations are performed by applying the electrodes to an electrode cutter. An amount of force is applied to the electrodes for a defined period of time, the force and time preferably conforming to the cutter manufacturer's specification so the electrode geometry will be fully restored.

The abrasive dressing station is arranged for performing an abrasive dressing operation, i.e. for restoring the cleanliness of the electrode using an abrasive tool. Unlike cutting, the electrode geometry is not restored.

Preferably, the abrasive dressing station is arranged for performing a number of different dressing options and more preferably a minimal, a medium or a heavy abrasive dressing operation. The degree of abrasion will be governed by the amount of force applied to the electrodes and the period of time for which the abrasive dressing operation is applied, the force and time preferably conforming to the dressing station manufacturer's specifications.

The replacement station is arranged for performing a replacement operation, i.e. for replacing both the upper and lower electrodes, or only one of them.

The control and processing station 12 is arranged (programmed) to implement an automated welding electrode adaptive maintenance method. For this purpose, the control and processing station 12 is arranged (programmed) to receive as input data electrode parameters representative of the wear conditions of the electrodes from the sensor equipment 14 during a quality check that is performed before or after, and preferably immediately after electrode periodical maintenance. The control and processing station 12 is then arranged (programmed) to process the electrode parameters representative of the wear conditions of the electrodes based on comparison with predetermined reference parameters, which have been derived, for example, from laboratory trials. Finally, the control and processing station 12 is arranged (programmed) to output instructions to either:

- Continue welding without altering the maintenance regime
- Continue welding and alter the frequency or severity of the maintenance regime
- Continue welding and alter the maintenance regime, sending the electrode or electrodes to one maintenance station and performing a maintenance operation that is appropriate to the electrode condition.

Figure 2:
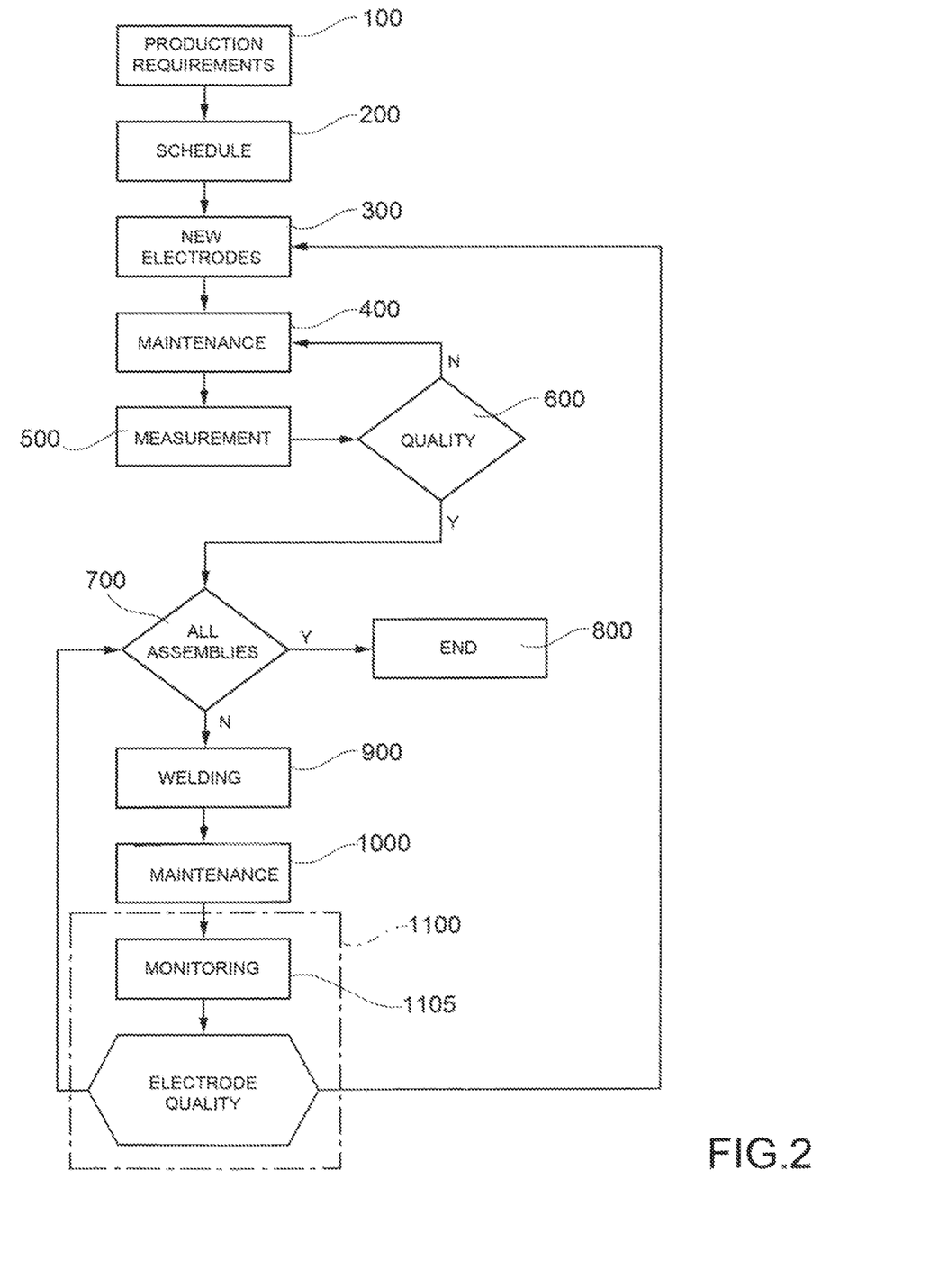
FIG. 2 is a flow chart of an automatic adaptive welding electrode maintenance method implemented by the system of FIG. 1 within a RSW production environment.

Referring to FIG. 2, an automated method for adaptively controlling welding electrode maintenance within the environment of an RSW production process is disclosed.

At step 100 a number of parameters indicative of production requirements are input to the system, preferably including:

a) the number of welds per assembly, i.e. the number of welds that make up each assembly under production;
b) the electrode type, i.e. the diameter, minimum length and tip geometry of the electrodes;
c) the production material, i.e. the material being welded including any coatings;

Preferably, a further parameter can be supplied to the system, i.e. the number of assemblies (per shift), that defines the total number of assemblies that are to be produced.

At step 200 a starting electrode maintenance schedule is generated, including default electrode maintenance parameters e.g. number of welds per component, number of components per production shift, maximum allowable maintenance time, total number of maintenance operations, electrode geometry, preferably based on the recommendations of the maintenance station manufacturer. Starting from the above parameters, a default maintenance frequency, i.e. the number of assemblies between maintenance operations, can be calculated and also stored in the electrode maintenance schedule. This will also define the number of shifts where the electrodes can be used to weld, before requiring replacement.

The maintenance frequency calculation is derived from expert knowledge that defines the number of welds that can be undertaken before a minimal dressing operation is required to maintain the electrode quality. This frequency is used to calculate the number of assemblies that can be completed before a dressing or cutting action is required to restore or enhance the electrode condition to a known acceptable state.

A starting electrode maintenance schedule can be further optimized by the system in a continued learning phase, during operation of the system.

At step 300 a new pair of electrodes are mounted onto the welding gun.

At step 400 the new electrodes are processed to achieve the required geometry and surface cleanliness. New electrodes do not always have the required shape and parallel alignment required for welding. Before welding the electrodes undergo a maintenance cycle on the cutter to prepare their geometry. At step 500 a measurement of the electrode quality is made.

At step 600 the software-based control and processing station compares measured values of electrode parameters with reference parameters, i.e. values/thresholds of electrode quality to determine whether the electrode is fit for production. In the event the geometry and cleanliness of one or both electrodes is not within specification, then the cutting operation and sensor measurement will be repeated. If the electrode geometry and cleanness is within the required specifications then the welding operation can take place.

If at step 700 all the assemblies have been welded, then the system considers at step 800 that a shift is completed.

At step 800 all assemblies have been completed and the end of the production shift has been reached. At this point the automated production process will stop.

If all assemblies have not yet been completed at step 700, then welding will continue.

At step 900 the system performs welding of the assemblies for production in a welding cycle. The amount of welds made (number of assemblies produced) per welding cycle is defined by the generated electrode maintenance schedule. At the beginning of production this electrode maintenance schedule is taken from the data generated in step 200. Later in production this maintenance schedule is altered automatically based upon input from the software-based control and processing station 12.

Once the specified number of assemblies has been welded, the electrodes are presented to an electrode maintenance station, step 1000. Electrode maintenance is performed in accordance with the maintenance regime that is first defined in step 200 and later influenced by the electrode quality monitoring in step 1100.

After having performed electrode maintenance, the system monitors the electrode condition (electrode quality) at step 1100 by means of the sensor equipment, thus acquiring geometric and cleanliness measurements. The geometric measurements being specifically electrode length and tip diameter. Electrode cleanliness measurements are then compared with predetermined quality metric reference values determined by expert knowledge (e.g. reflectivity of the surface of the electrodes) in order to evaluate the degree of electrode quality, the electrode quality being assessed if a predetermined electrode quality metric (i.e. geometric and cleanliness measurements) falls in one of a plurality of percentage ranges (R1-Rx).

The control and processing station 12 makes decisions based upon the measured electrode quality data, electrode length, tip diameter and cleanliness. The logical flow step required to make these decisions is shown in FIG. 3 and is described below. The output of step 1100 is a return to the production cycle with either new electrode tips at step 300 or to step 700 with an altered electrode maintenance regime, or with no changes to the electrode maintenance regime.

Figure 3A:
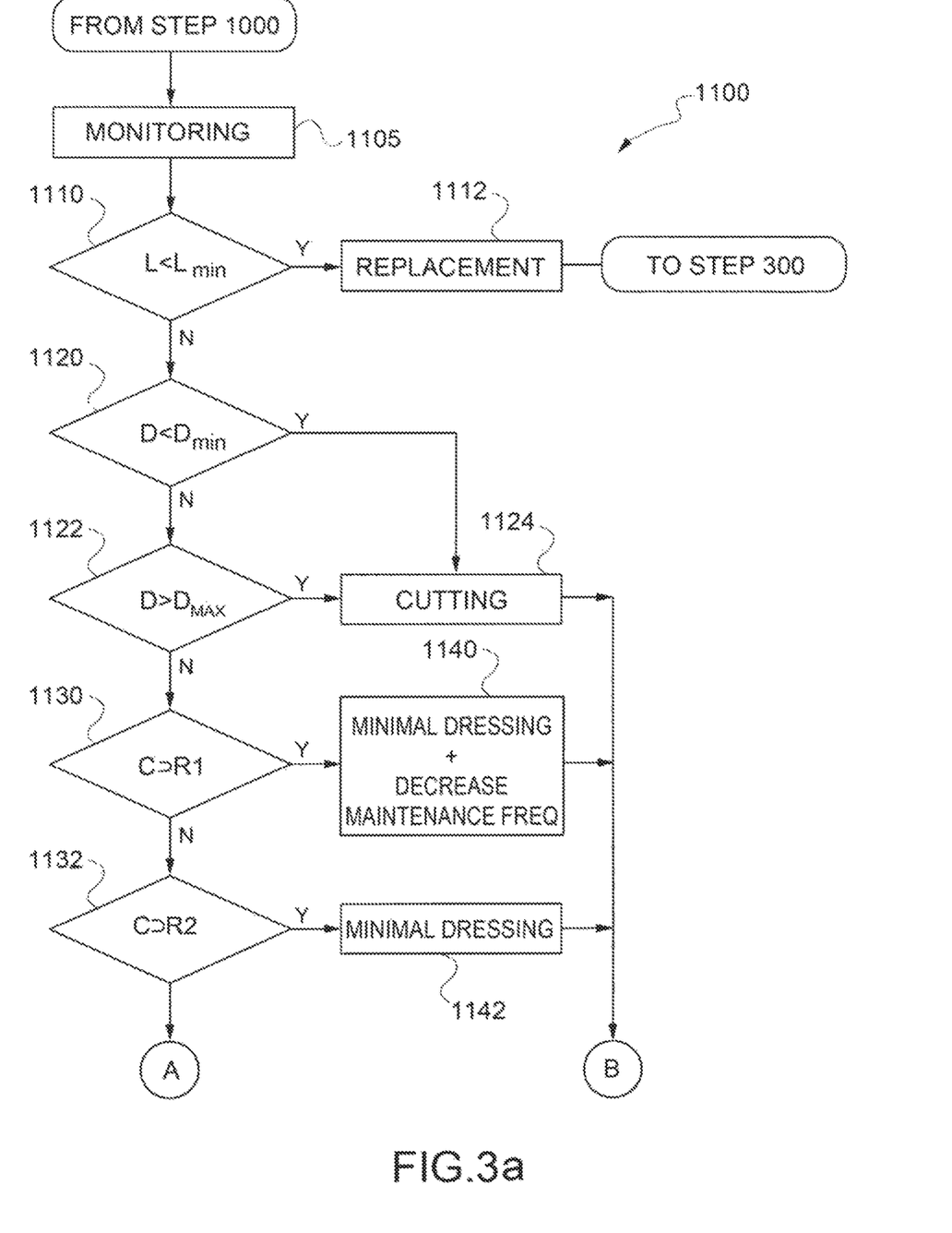
Figure 3B:
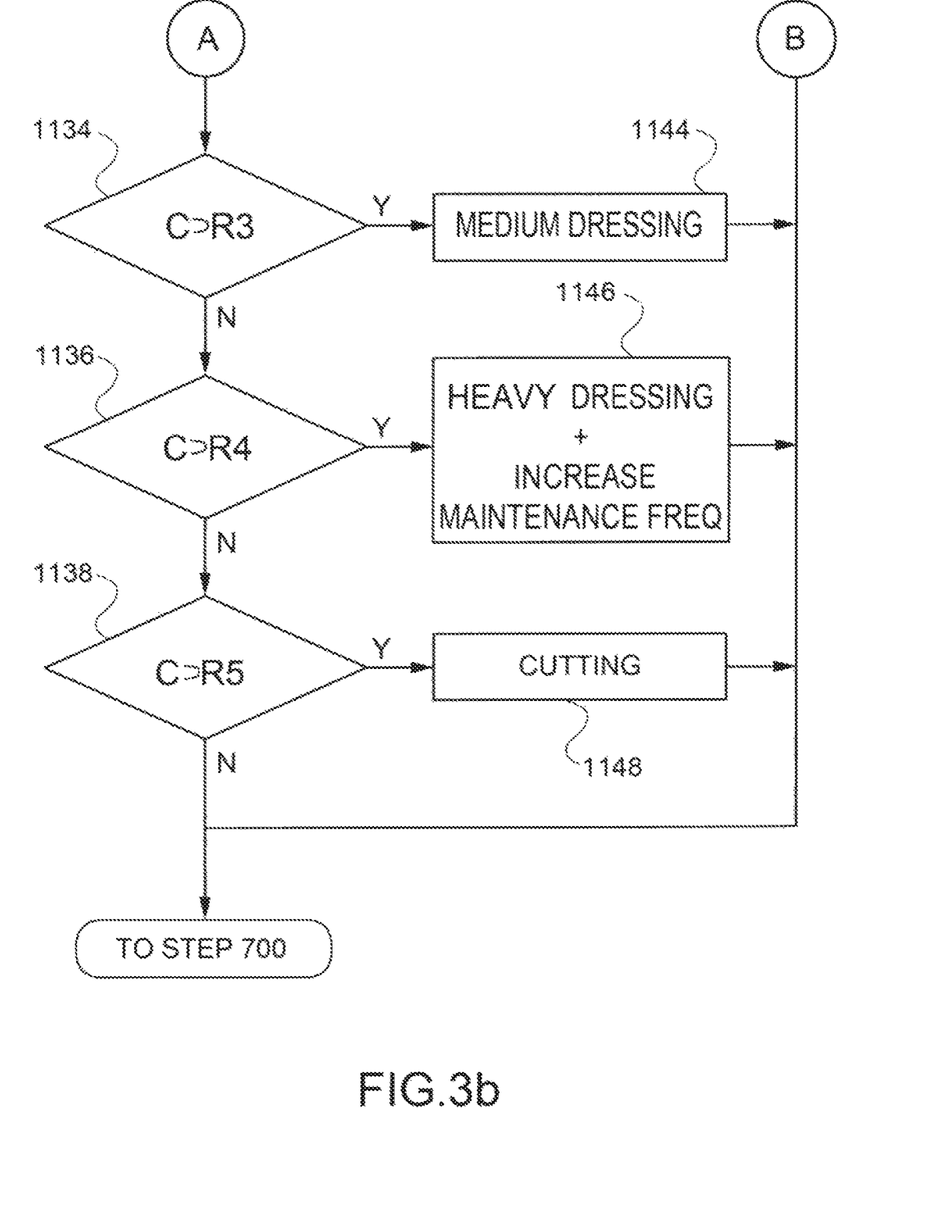

Referring to FIG. 3 (FIGS. 3a and 3b), step 1100 of the automated method for adaptively controlling welding electrode maintenance is detailed.

At step 1105 the system monitors electrode conditions (i.e. electrode quality or electrode wear) by means of the sensor equipment, thus acquiring geometric and cleanliness measurements through signal S3, the geometric and cleanliness measurements being used for comparison with reference values in order to evaluate the degree of electrode quality, the electrode quality being assessed if a predetermined electrode quality metric (i.e. geometric and cleanliness measurements) falls in one of a plurality of ranges (R1-Rx) of the geometric and cleanliness measurement values acquired at step 200 for the new electrode. An example of a system with 5 percentage ranges is shown in FIG. 3.

At step 1110 the length L of both electrodes is compared with a predefined threshold minimum electrode length $L_{min}$. If at least one electrode has a measured length that is smaller than said predefined threshold value, a deteriorated condition for the electrode is determined and the control and processing station 12 issues at step 1112 an instruction (typically, an electronic signal S1 that conveys a message to a movement unit, e.g. a robot or like transportation system that moves and controls the position of the welding gun), to move the welding gun to the replacement substation, and an instruction (through the same or a different signal S1) to the replacement substation to operate replacement of the electrode(s). The production process will then continue from step 700 (in FIG. 2).

At steps 1120 and 1122 either electrode tip diameter D is compared with a predefined threshold minimum diameter $D_{min}$, respectively maximum electrode diameter $D_{max}$. If at least one electrode has a measured diameter outside the predefined range between said minimum and maximum threshold values, a deteriorated condition for the electrode is determined and the control and processing station 12 issues at step 1124 an instruction (typically, an electronic signal S1 that conveys a message to a movement unit, e.g. a robot or like transportation system that moves and controls the position of the welding gun), to alter the next proceeding electrode maintenance operation (i.e. the electrode maintenance operation of the next welding cycle) at step 1000 (in FIG. 2). At step 1000 the welding gun will accordingly be moved to the cutting station and the electrode tip face will be cut back to the desired shape.

At steps 1130, 1132, 1134, 1136 and 1138 either electrode tip cleanliness C is respectively compared with a predefined cleanliness category or range, and a category of maintenance (particularly, a degree of abrasive dressing or cutting) that is needed is selected based on the ascertained cleanliness.

Specifically, whether at step 1130 is detected that either electrode tip cleanliness C is in a first cleanliness range R1, then minimal deterioration in electrode condition is determined. Processing station 12 issues at step 1140 an instruction (typically, an electronic signal S1 that conveys a message to a movement unit, e.g. a robot or like transportation system that moves and controls the position of the welding gun), to alter the next proceeding electrode maintenance operation (i.e. the electrode maintenance operation of the next welding cycle) at step 1000 (in FIG. 2). The intensity of the abrasive dressing operation will be reduced and the frequency of dressing will decrease by a predetermined number of assemblies, where said predetermined number depends on the material and coating being welded, at step 900.

If none of the electrodes is determined to have cleanliness in the first cleanliness range, then at step 1132 is determined whether either electrode tip cleanliness C is in a second cleanliness range R2 If so, a slightly deteriorated condition for the electrode is determined and the control and processing station 12 issues at step 1142 an instruction (typically, an electronic signal S1 that conveys a message to a movement unit, e.g. a robot or like transportation system that moves and controls the position of the welding gun), to retain the same electrode maintenance operation and frequency at the next proceeding electrode maintenance operation (i.e. the electrode maintenance operation of the next welding cycle) step 1000 (in FIG. 2). The intensity of the abrasive dressing operation will not be altered and the frequency of dressing will remain the same.

If none of the electrodes is determined to have cleanliness in the second cleanliness range, then at step 1134 is determined whether either electrode tip cleanliness C is in a third cleanliness range R3: If so, a heavily deteriorated condition for the electrode is determined and the control and processing station 12 issues at step 1144 an instruction (typically, an electronic signal S1 that conveys a message to a movement unit, e.g. a robot or like transportation system that moves and controls the position of the welding gun), to alter the next proceeding electrode maintenance operation (i.e. the electrode maintenance operation of the next welding cycle) at step 1000 (in FIG. 2). The intensity of the abrasive dressing operation will be increased but the frequency of dressing will remain the same.

If none of the electrodes is determined to have cleanliness in the third cleanliness range, then at step 1136 is determined whether either electrode tip cleanliness C is in a fourth cleanliness range R4: If so, a more heavily deteriorated condition for the electrode is determined and the control and processing station 12 issues at step 1146 an instruction (typically, an electronic signal S1 that conveys a message to a movement unit, e.g. a robot or like transportation system that moves and controls the position of the welding gun), to alter the next proceeding electrode maintenance operation (i.e. the electrode maintenance operation of the next welding cycle) at step 1000 (in FIG. 2). The intensity of the abrasive dressing operation will be increased and the frequency of dressing will increase, by a predetermined number of assemblies, where said predetermined number depends on the material and coating being welded, at step 900.

If none of the electrodes is determined to have cleanliness in the fourth cleanliness range, then at step 1138 is determined whether either electrode tip cleanliness C is in a fifth cleanliness range R: If so, a severely deteriorated condition for the electrode is determined and the control and processing station 12 issues at step 1148 an instruction (typically, an electronic signal S1 that conveys a message to a movement unit, e.g. a robot or like transportation system that moves and controls the position of the welding gun), to alter the next proceeding electrode maintenance operation (i.e. the electrode maintenance operation of the next welding cycle) at step 1000 (in FIG. 2). At step 1000 the welding gun will accordingly be moved to the cutting station and the electrode tip face will be cut back to the desired shape.

In any case production is continued at step 900 (in FIG. 2) after maintenance operations at steps 1112, 1124, 1140, 1142, 1144, 1146, 1148, respectively.

As already disclosed with reference to FIG. 2, after having performed electrode maintenance, the system monitors electrode quality at step 1100 by means of the sensor equipment, thus acquiring geometric and cleanliness measurements. The geometric and cleanliness measurements are then compared with reference values in order to evaluate the degree of electrode quality, the electrode quality being assessed if i.e. the electrodes are measured to determine their length, geometry and cleanliness, and these measurements are employed to optimize the dressing and cutting operations, i.e. the electrode maintenance schedule.

As there are two electrodes in a welding gun, the worst value of the two will always be used for cleanliness and geometry (length and diameter) measurements. Length measurements can be treated individually by asymmetric electrode replacements.

In conclusion, the adaptive maintenance system and method according to the invention advantageously increases the lifetime of spot welding electrodes and improves the overall quality of the spot welds created.

The adaptive maintenance system and method according to the invention achieve these goals by combining a number of innovative techniques, i.e.:

i) employing an abrasive dressing operation for cleaning the welding electrodes as well as periodically employing a traditional electrode tip cutter;

ii) using specialized equipment to measure electrode length, electrode geometry and electrode cleanliness;

iii) employing an adaptive technique that optimize the abrasive and mechanical cutting operations based on measured values;
iv) supporting 'asymmetric' electrode replacement, where an electrode that has insufficient remaining length is replaced without replacing the other electrode from the pair.

As a further advantage, in addition to electrode quality data, feedback from the weld gun (if an electric servo gun is utilized), may be used to allow determination of the rate of material removal from the electrodes, permitting calculation and optimization of electrode life. This will also prevent dressing through the electrodes towards the end of their life. Also, the performance of the abrasive tooling may be assessed by the system and by recording any incremental increase in required dress time over successive shifts the system is adapted to notify of a need for abrasive tool replacement, when the dress time approaches the maximum allowable for the dress cycle (which is a user-defined requirement).

It shall be apparent that, the principle of the invention remaining the same, the embodiments and implementation details will be able to be widely varied compared to what has been described and illustrated by way of non-limiting example only, without departing from the scope of the invention as defined by the appended claims.

The invention claimed is:

1. An automated welding electrode adaptive maintenance method, comprising:
    acquiring a predetermined electrode maintenance schedule that includes electrode parameters and defines a welding cycle in which a specified number of assemblies are welded by a welding gun;
    acquiring, during a first welding cycle, welding electrode parameters representative of a wear condition of at least one electrode mounted on the welding gun at a predetermined maintenance frequency;
    selecting a maintenance operation for said at least one electrode based on a comparison of said electrode parameters representative of the wear condition of said at least one electrode with predetermined reference parameters;
    issuing a signal to a selected maintenance station for performing said selected maintenance operation;
    adjusting the electrode maintenance schedule by adjusting an electrode maintenance frequency and severity of the maintenance based on said electrode parameters representative of the wear condition of said at least one electrode until the wear condition is consistently maintained after each maintenance operation, wherein said electrode parameters representative of the wear condition of said at least one electrode are acquired after each maintenance operation and before a subsequent welding cycle; and
    applying the adjusted electrode maintenance schedule to the at least one electrode after the specified number of assemblies has been welded by the welding gun to determine that one of: changing electrode tips, keeping the electrode tips or altering the electrode maintenance schedule, will be performed; and
    performing a subsequent maintenance operation at the selected maintenance station after the subsequent welding cycle in accordance with the adjusted electrode maintenance frequency.

2. The automated welding electrode adaptive maintenance method according to claim 1, wherein said maintenance operation is performed after a welding cycle following the acquisition of said electrode parameters representative of a wear condition of the at least one electrode.

3. The automated welding electrode adaptive maintenance method according to claim 1, wherein acquiring welding electrode parameters representative of a wear condition of the at least one electrode comprises acquiring a geometric parameter of said at least one electrode including a measured diameter of the at least one electrode.

4. The automated welding electrode adaptive maintenance method according to claim 3, including comparing the measured electrode diameter with a predetermined diameter threshold range and selecting a second electrode maintenance operation if the measured electrode diameter is outside said predetermined diameter threshold range, whereby a deteriorated condition for the at least one electrode is determined.

5. The automated welding electrode adaptive maintenance method according to claim 4, wherein selecting the second electrode maintenance operation includes issuing a cutting instruction for conveying the at least one electrode to a cutting station.

6. The automated welding electrode adaptive maintenance method according to claim 1, wherein acquiring welding electrode parameters representative of a wear condition of the at least one electrode comprises acquiring a geometric parameter of said at least one electrode including a measured length of the at least one electrode.

7. The automated welding electrode adaptive maintenance method according to claim 6, including comparing the measured electrode length with a predetermined minimum length threshold and selecting a first electrode maintenance operation if the measured electrode length is below said predetermined minimum length threshold, whereby a deteriorated condition for the at least one electrode is determined.

8. The automated welding electrode adaptive maintenance method according to claim 7, wherein selecting the first electrode maintenance operation includes issuing a replacing instruction for conveying the at least one electrode to a replacement station.

9. The automated welding electrode adaptive maintenance method according to claim 1, wherein acquiring welding electrode parameters representative of a wear condition of the at least one electrode comprises acquiring a cleanliness parameter of said at least one electrode, including a reflectivity value of a surface of the at least one electrode.

10. The automated welding electrode adaptive maintenance method according to claim 9, including:
    comparing the measured electrode cleanliness with a plurality of predetermined cleanliness ranges;
    when the measured cleanliness is in a first cleanliness range indicating minimal deterioration of the at least one electrode, reducing severity of abrasive dressing operation and frequency of the abrasive operation by a predetermined number of assemblies;
    when the measured cleanliness is in a second cleanliness range indicating a slight deterioration of the at least one electrode, retaining the same electrode maintenance operation and frequency;
    when the measured cleanliness is in a third cleanliness range indicating a heavy deterioration of the at least one electrode, increasing severity of abrasive dressing operation and maintaining the frequency of the abrasive operation;
    when the measured cleanliness is in a fourth cleanliness range indicating a more heavy deterioration of the at least one electrode, increasing severity of abrasive dressing operation and increasing the frequency of the abrasive operation by a predetermined number of assemblies; and when the measured cleanliness is in a fifth cleanliness range indicating a severe deterioration of the at least one electrode, moving the welding gun to a cutting station and cutting back a top of the at least one electrode to a desired shape.

11. The automated welding electrode adaptive maintenance method according to claim 10, wherein selecting a third electrode maintenance operation includes issuing an abrasive dressing instruction for conveying the at least one electrode to an abrasive dressing station.

12. The automated welding electrode adaptive maintenance method according to claim 11, wherein selecting the third electrode maintenance operation further includes adjusting the maintenance frequency.

13. The automated welding electrode adaptive maintenance method according to claim 11, wherein selecting the third electrode maintenance operation further includes adjusting an abrasive dressing intensity.

14. The automated welding electrode adaptive maintenance method according to claim 10 wherein selecting a third electrode maintenance operation includes issuing a cutting instruction for conveying the at least one electrode to the cutting station.

15. An automated welding electrode adaptive maintenance system, comprising a control and processing station arranged for performing the method of claim 1.

16. A non-transitory computer readable medium, storing instructions thereon for electrode adaptive maintenance, the instructions comprising:

acquiring a predetermined electrode maintenance schedule that includes electrode parameters and defines a welding cycle in which a specified number of assemblies are welded by a welding gun;

acquiring, during a first welding cycle, welding electrode parameters representative of a wear condition of at least one electrode mounted on the welding gun at a predetermined maintenance frequency;

selecting a maintenance operation for said at least one electrode based on a comparison of said electrode parameters representative of the wear condition of said at least one electrode with predetermined reference parameters;

issuing a signal to a selected maintenance station for performing said selected maintenance operation;

controlling adjusting the electrode maintenance schedule by adjusting an electrode maintenance frequency and severity of the maintenance based on said electrode parameters representative of the wear condition of said at least one electrode until the wear condition is consistently maintained after each maintenance operation, wherein said electrode parameters representative of the wear condition of said at least one electrode are acquired after each maintenance operation and before a subsequent welding cycle; and applying the adjusted electrode maintenance schedule to the at least one electrode after a specified number of assemblies has been welded by the welding gun to determine that one of: changing electrode tips, keeping the electrode tips or altering the electrode maintenance schedule will be performed; and performing a subsequent maintenance operation at the selected maintenance station after the subsequent welding cycle in accordance with the adjusted electrode maintenance frequency.

\* \* \* \* \*